3,598,524
Patented Aug. 10, 1971

3,598,524
PRODUCTION OF SODIUM PERBORATE
Victor J. Reilly, Memphis, Tenn., assignor to E. I. du Pont de Nemours and Company, Wilmington, Del.
No Drawing. Filed Sept. 25, 1968, Ser. No. 762,625
Int. Cl. C01b *15/12, 35/00;* B01d *9/02*
U.S. Cl. 23—60                                                 6 Claims

ABSTRACT OF THE DISCLOSURE

A process for producing sodium perborate having a relatively low bulk density and a relatively high solution rate wherein sodium metaborate and hydrogen peroxide are fed to and reacted in an aqueous reaction slurry of sodium perborate from which the sodium perborate is crystallized in more than one crystallization zone. The crystallization in the first zone is effected in the presence of a relatively high concentration of excess sodium metaborate and the completion of the crystallization is effected in one or more subsequent zones in the presence of a relatively low concentration of excess sodium metaborate resulting from the addition of hydrogen peroxide to the slurry in the subsequent crystallization zone.

BACKGROUND OF THE INVENTION

Sodium perborate is an important article of commerce having various uses, the major ones being as a bleaching agent for textiles and in laundry operations. Because of the variety of uses, it has become highly desirable to produce the sodium perborate in a variety of grades respecting crystal sizes and shapes, bulk densities and solution rates. Thus, for some purposes, moderately or high bulk density material is desired or needed, while in others relatively low bulk density material is desired, for example, when the sodium perborate is intended to be blended with other low density materials. For one such use, the type of sodium perborate most desired is one which is dust-free and has a relatively low bulk density, and a relatively high solution rate.

The usual sodium perborate of commerce is a compound of the formula $NaB_3 \cdot 4H_2O$ (also written as $NaBO_2 \cdot H_2O_2 \cdot 3H_2O$). It is called "sodium perborate tetrahydrate" or, more commonly, simply "sodium perborate." This latter term will generally be used herein.

One method of preparing sodium perborate is that of Carveth U.S. Pat. 1,716,874. It involves the addition of hydrogen peroxide to a cold solution of sodium metaborate. The product crystallizes from the solution as agglomerates of small crystals. Another method is that of Nees U.S. Pat. 2,380,779 involving the addition of a solution of sodium hydroxide to a solution of hydrogen peroxide and borax. A low bulk density product of fine particles is obtained. Another method of producing a low bulk density product consisting of porous spheres is that of Gonze et al. U.S. Pat. 3,131,995. This is a batch method carried out under very special conditions. Both of these methods for producing low bulk density material give products whose crystals or particles generally are rather fragile and, therefore, lead to dustiness on handling.

Various methods have been proposed for producing product of large grain size which will dissolve rapidly. Such methods are usually agglomeration methods such as those described in Pistor U.S. Pat. 2,979,464 and Bretschneider et al. U.S. Pat. 3,227,790. Since agglomeration methods start with preformed sodium perborate, they have the drawback of requiring a further processing step.

Another method for producing sodium perborate is that of Altimier et al. U.S. Pat. 2,828,183. This method is directed to the production of a product which is resistant to caking. It involves effecting the reaction of hydrogen peroxide and sodium metaborate in a solution from which the crystal product is formed in the presence of free borax and preferably also an excess of sodium metaborate. The product is of relatively high bulk density and consists of chunky crystals whose smallest dimension is of the order of about one sixth of the largest dimension. While such product is satisfactory for many uses, its bulk density is too great and its rate of solution is too low for other uses.

There is a distinct need for a method which will produce directly a sodium perborate product which is free-flowing and dust-free and has a relatively low bulk density and a good rate of solution. The present invention provides such a method.

SUMMARY OF THE INVENTION

The present invention relates to an improvement in the method of producing sodium perborate in which aqueous solutions of sodium metaborate and hydrogen peroxide are fed to an aqueous slurry of sodium perborate in which the sodium metaborate and hydrogen peroxide are reacted and from which the sodium perborate product is crystallized. The improvement involves (a) feeding the sodium metaborate and hydrogen peroxide solutions to the aqueous slurry which is under agitation in a first crystallization zone at such relative rates as will maintain in the liquid phase of the slurry in that zone a concentration of sodium metaborate which is substantially in excess of the concentration thereof that is stoichiometrically equal to the concentration of any hydrogen peroxide present in the liquid phase in that zone, (b) passing the slurry from the first crystallization zone to a second crystallization zone in which it is agitated while there is fed thereto hydrogen peroxide at such a rate as will effect a substantial reduction in the concentration of sodium metaborate in the liquid phase of the slurry in the second zone and thereafter (c) separating sodium perborate from the slurry.

DETAILED DESCRIPTION AND PREFERRED EMBODIMENTS

In the method of the invention, sodium perborate is produced by the reaction of sodium metaborate and hydrogen peroxide in accordance with the following equation:

(a)          $NaBO_2 + H_2O_2 + 3H_2O = NaBO_3 \cdot 4H_2O$ 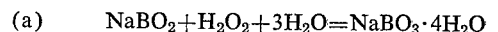

The reaction medium is an aqueous slurry of the sodium perborate to which the aqueous solutions of the reactants are fed. The hydrogen peroxide solution can be almost any of the commercially available solutions which contain hydrogen peroxide at a concentration of around 20% or more $H_2O_2$ by weight. Solutions containing from around 30–50% $H_2O_2$ are generally preferred although more concentrated solutions can be used. The sodium metaborate feed solution will generally contain sodium metaborate, $NaBO_2$, at a concentration of 2 to 4 mols per liter although solutions of higher lower concentrations can be used. The concentrations of sodium metaborate and hydrogen peroxide in the respective feed solutions should be such that the product sodium perborate produced in the reaction slurry will exceed the solubility of sodium perborate therein under the conditions of operation so that the perborate will crystallize.

The sodium metaborate feed solution can be prepared by dissolving pre-formed sodium metaborate in water or in the mother liquor from a previous sodium perborate preparation. Alternatively and preferably, the solution is prepared by the reaction of sodium hydroxide with borax in accordance with the following equation:

(b)          $Na_2B_4O_7 + 2NaOH = 4NaBO_2 + H_2O$ 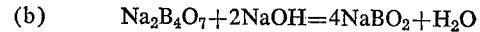

Obviously, boric acid can be employed as a source of the boron requirements in place of either borax or preformed sodium metaborate in preparing the metaborate feed solution.

The starting aqueous sodium perborate slurry to which the sodium metaborate and hydrogen peroxide feed solutions are fed can be a slurry of sodium perborate in water or in the mother liquor from a previous operation, or it can be prepared by the reaction between sodium metaborate and hydrogen peroxide solutions.

Since sodium perborate is produced in and crystallized from the slurry, operation of the process results in a replenishment of that portion of the reaction slurry which, in accordance with the invention, is withdrawn from the initial crystallization zone and passed to a second crystallization zone. The rate of passage of slurry from the first to the second of such zones and from the second zone to a facility for de-watering the slurry will be approximately equal to the rate of feed of the reactant solutions to the first zone. The slurry is agitated in each crystallization zone.

In accordance with the invention, the sodium metaborate and hydrogen peroxide feed solutions are fed to the slurry in the first crystallization zone at such relative rates as will maintain in the liquid phase of the slurry of that zone, a sodium metaborate concentration which will be substantially in excess of that concentration thereof which is stoichiometrically equal to the concentration of hydrogen peroxide present in the liquid phase of that zone. The concentration of the excess sodium metaborate will generally be at least 0.1 molar, e.g., 0.1–1 molar, the preferred concentrations being from about 0.2–0.8 molar.

It is an essential feature of the invention that the concentration of excess sodium metaborate, i.e., sodium metaborate present in excess of that stoichiometrically equivalent to hydrogen peroxide present, in the second crystallization zone be substantially lower than in the first zone, i.e., it should generally be reduced by at least about 20%, e.g., 20–100%, of the concentration of excess metaborate present in the liquid phase of the slurry in the first crystallization zone. Preferably, the reduction of the concentration of excess metaborate in the second zone will be from 40–70% of its concentration in the first zone. Such reductions in the concentration of excess metaborate in going from the first to the second crystallization zone is effected by the feeding of hydrogen peroxide to the agitated slurry in the second zone, thereby to convert some of the excess metaborate to perborate.

The feature of operating the first crystallization zone in the presence of a relatively high concentration of excess sodium metaborate in the liquid phase is distinctly advantageous in that it results in the product sodium perborate crystallizing in the form of relatively thin plates which are of strong structure resistant to attrition and dry to yield a product having a relatively low bulk density and a relatively high solution rate. However, if crystallization of the perborate product is effected in a single zone in the presence of such high concentration of excess sodium metaborate, the crystals tend to stick together during drying so that drying by the usual commercial methods is quite impracticable. However, I have found that the beneficial results of crystallizing in the presence of a high excess metaborate concentration can be retained without these undesirable consequences if crystallization of the perborate product is completed in one or more subsequent crystallization zones to which the reaction slurry from the first zone is passed while feeding hydrogen peroxide to such subsequent zone or zones so as to effect a substantial reduction of the concentration of excess sodium metaborate in the liquid phase in the subsequent zone or zones. Product produced by effecting the crystallization thereof in a plurality of zones under these conditions not only is characterized by its strong crystal structure, low bulk density and rapid rate of solution, but also by its free-flowing properties whereby it possesses excellent movability during drying and thereafter so that drying can be readily achieved without difficulty.

It is convenient to describe the components of the liquid phase of the reaction slurry as consisting of sodium metaborate ($NaBO_2$), hydrogen peroxide ($H_2O_2$) and water. Generally, small amounts of borax ($Na_2B_4O_7$) may also be present although the use of metaborate feed solutions containing borax is not essential. Borax, if present, appears not to exert any significant effect upon the operation of the process or the type of characteristics of the perborate product obtained. However, if present at concentrations exceeding about 0.8 molar, borax may tend to separate out with the sodium perborate. This is not particularly harmful but is generally undesirable since the borax so present in the product acts simply as a diluent.

The concentration of borax or what is called borax, in the feed solution or the aqueous phase of the reaction slurry can be determined by titration with alkali to a phenolphthalein end point of a sample to which has been added an excess of glycerol or mannitol. The borax concentration may be calculated from such titration as follows:

$$\text{Mols/l. } Na_2B_4O_7 = \frac{\text{ml. of alkali} \times \text{Norm. of alkali}}{2 \times \text{ml. of sample}}$$

The concentration of sodium metaborate in either the sodium metaborate feed solution or the liquid phase of the reaction slurry may be determined by titrating a separate sample with acid to a methyl red end point. The concentration of sodium metaborate may be calculated from such titration as follows:

$$\text{Mols/l. } NaBO_2 = \left[\frac{\text{ml. acid} \times \text{Norm. of acid}}{\text{ml. of sample}}\right] - [2 \times \text{mols/l.}] \, Na_2B_4O_7$$

The concentration of hydrogen peroxide in either the hydrogen peroxide feed solution or the liquid phase of the reaction slurry may be determined by titration with potassium permanganate in the well-known manner, the concentration then being calculated as mols of $H_2O_2$ per liter.

When the sodium metaborate and hydrogen peroxide concentrations in the liquid phase of the reaction slurry have been determined and calculated as indicated above, the difference between the molar concentrations of sodium metaborate and hydrogen peroxide represents the concentration of "excess" sodium metaborate. Thus, as used herein, the concentration of "excess" sodium metaborate is defined as:

$$\text{Mols/l. excess } NaBO_2 = \text{Mols/l. } NaBO_2 - \text{Mols/l. } H_2O_2$$

In practicing the improved method of the invention, crystallization in the first zone is effected while feeding the feed solutions at such relative rates as will maintain in the liquid phase of the slurry a concentration of "excess" sodium metaborate (as defined above) of at least 0.1 molar, e.g., 0.1–1 molar, and preferably 0.2–0.8 molar. On the other hand, the crystallization in the subsequent zone or zones is effected while feeding to the slurry sufficient hydrogen peroxide to reduce the concentration of "excess" sodium metaborate (as defined above) in the liquid phase by at least 20%, e.g., 20–100%, and preferably 40–70% of the concentration of such "excess" sodium metaborate present in the first zone. It is usually desirable that the amount of hydrogen peroxide fed to the second or subsequent zones be less than that amount which will result in the presence of free hydrogen peroxide, i.e., hydrogen peroxide in excess of that amount which is stoichiometrically equivalent to any sodium metaborate present in the liquid phase.

The method of the invention is illustrated by the following example in which all molar concentrations were determined as indicated above.

EXAMPLE

Part (a)

A sodium metaborate solution containing 2.9 mols sodium metaborate ($NaBO_2$) and 0.05 mol borax ($Na_2B_4O_7$) per liter was prepared from the reaction of sodium hydroxide and borax in mother liquor from a previous crystallization. This solution, to which was added a magnesium silicate stabilizer, and a 35 weight percent aqueous solution of hydrogen peroxide were fed to an agitated slurry of sodium perborate maintained at 35° C. while controlling the relative proportions of these feeds so as to maintain in the liquid phase of the slurry a sodium metaborate concentration of 0.43 molar. The hydrogen peroxide concentration in the liquid phase was 0.24 molar, so that the concentration of excess sodium metaborate was 0.19 molar. Product slurry was withdrawn from the vessel to which the feed solutions were fed, the withdrawn slurry was de-watered by centrifuging and the resulting wet crystal product was dried in a rotary warm air dryer. No difficulty was experienced in moving the wet crystals in the dryer or in discharging the dried sodium perborate product. This method of producing sodium perborate is essentially that described in Altimier et al. U.s. Pat. No. 2,828,183.

Part (b)

Sodium perborate was produced in essentially the same manner as described in Part (a) except that the relative rates at which the feed solutions were fed to the reaction slurry were adjusted so as to maintain in the liquid phase of the slurry a sodium metaborate concentration of 1.05 molar. Since the hydrogen peroxide concentration in the liquid phase was 0.40 molar, the concentration of excess sodium metaborate was 0.65 molar. The slurry withdrawn from the reaction vessel was de-watered and dried as in Part (a). However, considerable difficulty was experienced in drying due to a tendency for the crystals to stick together and to the dryer, presumably due to the high dissolved solids content of the mother liquor wetting the crystals. These drying difficulties were such as to make commercial operation extremely difficult. However, the product crystals had approximately the same desirable shape and physical properties as did those of the product made in Part (c) below.

Part (c)

The same feed solutions and the general method of operation described in Parts (a) and (b) were followed except that the relative rates of feed of the feed solutions were controlled so as to maintain a sodium metaborate concentration in the liquid phase of the perborate slurry at 1.05 molar, i.e. the same as in Part (b). As in Part (b), the hydrogen peroxide concentration in the liquid phase was 0.4 molar and the concentration excess of sodium metaborate was 0.65 molar. In this instance, instead of directly dewatering the product reaction slurry, it was transferred to a second vessel in which it was stirred and to which hydrogen peroxide was added at a rate such that the sodium metaborate concentration in the liquid phase in the second vessel was reduced to 0.55 molar. Since the hydrogen peroxide concentration in the liquid phase in the second vessel was 0.3 molar, the cencentration of excess sodium metaborate was 0.25 molar. The temperature of the slurry in the second vessel was 39° C. or 4° C. higher than the temperature in the first vessel due to heat released from the crystallization reaction. Reaction slurry was withdrawn from the second vessel and de-watered and dried as in Parts (a) and (b). Contrasted to what was experienced in drying the product of Part (b), drying now proceeded without difficulty. The crystals moved in and through the dryer as easily as did the crystals of the product from Part (a) and there was essentially no tendency for them to stick together or to the walls of the dryer.

Various properties of the perborate products produced in Parts (a) and (c) above are compared in the following tabulation.

|  | Part (a) | Part (c) |
|---|---|---|
| Median crystal size, microns | 310 | 260 |
| Bulk density, gm./ml | 0.85 | 0.68 |
| Solution rate (minutes to dissolve 10 gm. in 1 liter water, 100° F., standardized conditions) | 2.75 | 2.0 |
| Ratios—length:width:thickness | 6.5:3:1 | 8:4:1 |

It will be seen from the above tabulation that the procedure of Part (c) in which crystallization was effected in two separate zones according to the method of the invention yielded product which was substantially less dense yet had a substantially higher rate of solution than the product obtained by the procedure of Part (a) in which crystallization was effected in a single zone. The product of Part (c) was composed of plate-like crystals which were resistant to attrition and, therefore, the product was essentially dust-free. It was also free-flowing and remained so during storage.

One advantage achieved through the addition of hydrogen peroxide in the second crystallization zone is that such addition reduces the metaborate concentration in the liquor and thereby normally will reduce the amount of metaborate lost in the customary liquor purge without in any way increasing the amount of peroxide lost in such purge. This is because the peroxide fed reacts with and converts dissolved metaborate to sodium perborate which crystallizes and is recovered as product.

The method of the invention can be practiced employing reaction temperatures ranging from around 5–50° C. although it is definitely preferred that the temperatures be within the range 20–40° C. The optimum amount of excess sodium metaborate present in the liquid phase of the reaction slurry of the first crystallization zone will vary somewhat depending upon the temperature at which the reaction is carried out. In general, the optimum concentration of excess metaborate will decrease as the reaction temperature is decreased and, conversely, will increase as the temperature is increased. However, whatever the temperature at which the reaction is carried out, the concentration of excess metaborate in the first crystallization zone should be substantially greater than its concentration in the second crystallization zone. Instead of completing the crystallization is a second zone, two or more crystallization zones subsequent to the first one can be employed, although the use of two zones generally will give highly satisfactory results.

Instead of simply adding hydrogen peroxide to the second crystallization zone in order to reduce the metaborate concentration in that zone by at least 20%, preferably 40–70%, of its concentration in the first zone sodium metaborate may also be added to the second zone along with the hydrogen peroxide that is added. It is only necessary that a greater number of mols of hydrogen peroxide than sodium metaborate be added to the second zone in order that an overall reduction of the metaborate concentration be achieved. Thus, the advantages of the method of the invention can be achieved by employing two or more crystallization vessels in series and adding hydrogen peroxide or a hydrogen peroxide-rich feed to at least one of the crystallizers other than the first in the series.

I claim:

1. In a method for producing sodium perborate wherein aqueous solutions of sodium metaborate and hydrogen peroxide are fed to an aqueous slurry of sodium perborate in which the metaborate and hydrogen peroxide are reacted and from which the sodium perborate is crystallized, the improved comprising (a) feeding said sodium metaborate and hydrogen peroxide solutions to said slurry which is under agitation in a first crystallization zone at such relative rates as will maintain in the liquid phase of said slurry in said zone a concentration of sodium metaborate which is substantially in excess of that concentration thereof that is stoichiometrically equal to the concentration of hydrogen peroxide present in said liquid phase, (b) passing said slurry from said first crystallization zone to a second crystallization zone in which it is agitated while there is fed thereto hydrogen peroxide at such a rate as will effect a substantial reduction in the concentration of sodium metaborate in the liquid phase of said slurry in said second zone, and thereafter (c) separating sodium perborate from the slurry.

2. The method of claim 1 wherein the sodium metaborate and hydrogen peroxide solutions are fed in Step (a) at such relative rates as will maintain excess sodium metaborate in the liquid phase of the first crystallization zone at a concentration from about 0.1 to 1 molar, and hydrogen peroxide is fed in Step (b) at a rate such that the concentration of excess sodium metaborate in the liquid phase of the second crystallization zone is reduced by 20 to 100% of the concentration of excess sodium metaborate present in the liquid phase of the first crystallization zone.

3. The method of claim 2 wherein the concentration of excess sodium metaborate in Step (a) is maintained at about 0.2 to 0.8 molar and hydrogen peroxide is fed in Step (b) at such a rate such that the concentration of excess sodium metaborate in the liquid phase of the second crystallization zone is reduced by 40 to 70% of the concentration of excess sodium metaborate present in the liquid phase of the first crystallization zone.

4. The method of claim 1 wherein the reaction is effected at a temperature of 20 to 40° C.

5. The method of claim 2 wherein the reaction is effected at a temperature of 20 to 40° C.

6. The method of claim 3 wherein the reaction is effected at a temperature of 20 to 40° C.

References Cited

UNITED STATES PATENTS 3,348,907    10/1967    Pellens et al. ......... 23—60

FOREIGN PATENTS 1,057,586    5/1959    Germany ............. 23—60
940,262    10/1963    Great Britain ......... 23—60

MILTON WEISSMAN, Primary Examiner

U.S. Cl. X.R.

23—315